(12) United States Patent
Kim et al.

(10) Patent No.: US 8,610,867 B2
(45) Date of Patent: Dec. 17, 2013

(54) LIQUID CRYSTAL DISPLAY AND LIQUID CRYSTAL COMPOSITION INCLUDED THEREIN

(75) Inventors: Dong-Gyu Kim, Yongin-si (KR); Kyoung-Ju Shin, Hwaseong-si (KR); Jong-Ho Son, Seoul (KR); Yong-Kuk Yun, Hwaseong-si (KR); Jun-Pyo Lee, Cheonan-si (KR); Seunng-Soo Baek, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 730 days.

(21) Appl. No.: 12/356,370

(22) Filed: Jan. 20, 2009

(65) Prior Publication Data

US 2009/0185091 A1    Jul. 23, 2009

(30) Foreign Application Priority Data

Jan. 21, 2008  (KR) ........................ 10-2008-0006346

(51) Int. Cl.
*G02F 1/1343*    (2006.01)
(52) U.S. Cl.
USPC ............. 349/146; 349/48; 349/144; 349/167; 349/182
(58) Field of Classification Search
None
See application file for complete search history.

(56) References Cited

U.S. PATENT DOCUMENTS

| | | | |
|---|---|---|---|
| 6,992,742 B2 * | 1/2006 | Kim et al. ...................... | 349/129 |
| 2001/0045545 A1 * | 11/2001 | Tarumi et al. ............ | 252/299.63 |
| 2003/0136944 A1 * | 7/2003 | Takehara et al. ......... | 252/299.62 |
| 2006/0103800 A1 * | 5/2006 | Li et al. ......................... | 349/129 |
| 2006/0221277 A1 * | 10/2006 | Yang et al. .................... | 349/114 |
| 2011/0102695 A1 * | 5/2011 | Katayama et al. ............. | 349/41 |

FOREIGN PATENT DOCUMENTS

| | | |
|---|---|---|
| CN | 2182006 | 11/1994 |
| CN | 1282039 | 1/2001 |
| CN | 1637513 | 7/2005 |
| CN | 1723260 | 1/2006 |
| CN | 101096140 | 1/2008 |
| EP | 1 054 321 A2 | 11/2000 |
| EP | 1 872 948 A2 | 1/2008 |
| JP | 2005338818 | 12/2005 |
| KR | 1020030025685 | 3/2003 |
| KR | 1020070006981 | 1/2007 |

OTHER PUBLICATIONS

Chinese Office Action dated Sep. 27, 2011 issued for Chinese Patent Application No. 200910005055.0.
Chinese Second Office Acton dated Jun. 18, 2012 for Chinese Patent Application No. 200910005055.0.

* cited by examiner

*Primary Examiner* — Richard Kim
(74) *Attorney, Agent, or Firm* — H.C. Park & Associates, PLC

(57) ABSTRACT

Provided are a liquid crystal composition and a liquid crystal display (LCD) including the liquid crystal composition. The LCD includes a first display panel a second display panel facing the first display panel, and a liquid crystal composition disposed between the first display panel and the second display panel. If a dielectric constant in a direction parallel to a long axis of liquid crystals is defined as a horizontal dielectric constant $\in_\parallel$, a dielectric constant in a direction perpendicular to the long axis of the liquid crystals is defined as a vertical dielectric constant $\in_\perp$, and the difference between the vertical dielectric constant $\in_\perp$ and the horizontal dielectric constant $\in_\parallel$ is defined as dielectric anisotropy $\Delta\in$, then a ratio $\Delta\in/\in_\perp$ of the dielectric anisotropy $\Delta\in$ to the vertical dielectric constant $\in_\perp$ of the liquid crystal composition is 0.5 or less.

10 Claims, 11 Drawing Sheets

LIQUID CRYSTAL DISPLAY AND LIQUID CRYSTAL COMPOSITION INCLUDED THEREIN

This application claims priority from and the benefit of Korean Patent Application No. 10-2008-0006346, filed on Jan. 21, 2008, which is hereby incorporated by reference for all purposes as if fully set forth herein.

BACKGROUND OF THE INVENTION

1. Field of the Invention

The present invention relates to a liquid crystal display (LCD) and a liquid crystal composition included therein, and more particularly, to a liquid crystal composition that may provide an increased aperture ratio by negating the need for storage wiring, and an LCD including the liquid crystal composition.

2. Discussion of the Background

As modern society becomes more dependent on sophisticated information and communication technology, the need for larger and thinner displays is growing. In particular, since conventional cathode ray tubes (CRTs) have failed to fully satisfy this need, the demand for flat panel displays (FPDs), such as plasma display panels (PDPs), plasma address liquid crystal display panels (PALCs), liquid crystal displays (LCDs), and organic light emitting diodes (OLEDs), is dramatically increasing.

LCDs are one of the most widely used FPDs. An LCD includes two substrates, on which electrodes are disposed, and a liquid crystal layer disposed between the two substrates. The alignment of liquid crystals of the liquid crystal layer is altered when voltages are applied to the electrodes, thereby adjusting the light transmissivity of the LCD. In this way, the LCD displays a desired image.

In order for an LCD to effectively display an image, a signal transmitted to a pixel electrode to alter the alignment of the liquid crystals must be maintained for a certain period of time. Generally, a signal transmitted to the pixel electrode to alter the alignment of the liquid crystals leaks within a short period of time. Thus, storage capacitors are connected in parallel to the pixel electrode so that electric charges applied to the liquid crystals may be maintained for the necessary period of time.

However, since a storage capacitor in an LCD overlaps a portion of each pixel electrode, the pixel aperture ratio of the LCD may be reduced.

SUMMARY OF THE INVENTION

The present invention provides a liquid crystal display (LCD) including a liquid crystal composition that may increase an aperture ratio by negating the need for storage wiring.

The present invention also provides a liquid crystal composition that may increase an aperture ratio by negating the need for storage wiring.

Additional features of the invention will be set forth in the description which follows, and in part will be apparent from the description, or may be learned by practice of the invention.

The present invention discloses an LCD including a first display panel, a second display panel facing the first display panel, and a liquid crystal composition disposed between the first display panel and the second display panel. If a dielectric constant in a direction parallel to a long axis of liquid crystals is defined as a horizontal dielectric constant $\in_\parallel$, a dielectric constant in a direction perpendicular to the long axis of the liquid crystals is defined as a vertical dielectric constant $\in_\perp$, and the difference between the vertical dielectric constant $\in_\perp$ and the horizontal dielectric constant $\in_\parallel$ is defined as a dielectric anisotropy $\Delta\in$, then a ratio $\Delta\in/\in_\perp$ of the dielectric anisotropy $\Delta\in$ to the vertical dielectric constant $\in_\perp$ of the liquid crystal composition is 0.5 or less.

The present invention also discloses an LCD including a first display panel, a pixel electrode disposed on the first display panel, a second display panel facing the first display panel, a common electrode disposed on the second display panel and overlaps the pixel electrode, a decoupling electrode that partially overlaps the pixel electrode, and a liquid crystal composition disposed between the first display panel and the second display panel. If a dielectric constant in a direction parallel to a long axis of liquid crystals is defined as a horizontal dielectric constant $\in_\parallel$, a dielectric constant in a direction perpendicular to the long axis of the liquid crystals is defined as a vertical dielectric constant $\in_\perp$, and the difference between the vertical dielectric constant $\in_\perp$ and the horizontal dielectric constant $\in_\parallel$ is defined as dielectric anisotropy $\Delta\in$, then a ratio $\Delta\in/\in_\perp$ of the dielectric anisotropy $\Delta\in$ to the vertical dielectric constant $\in_\perp$ of the liquid crystal composition is 0.5 or less, and capacitance between the pixel electrode and the decoupling electrode is 5 to 20% of capacitance between the common electrode and the pixel electrode.

The present invention also discloses a liquid crystal composition whose ratio $\Delta\in/\Delta_\perp$ of dielectric anisotropy $\Delta\in$ to a vertical dielectric constant $\in_\perp$ is 0.5 or less when a dielectric constant in a direction parallel to a long axis of liquid crystals is defined as a horizontal dielectric constant $\in_\parallel$, a dielectric constant in a direction perpendicular to the long axis of the liquid crystals is defined as the vertical dielectric constant $\in_\perp$, and the difference between the vertical dielectric constant $\in_\perp$ and the horizontal dielectric constant $\in_\parallel$ is defined as the dielectric anisotropy $\Delta\in$.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
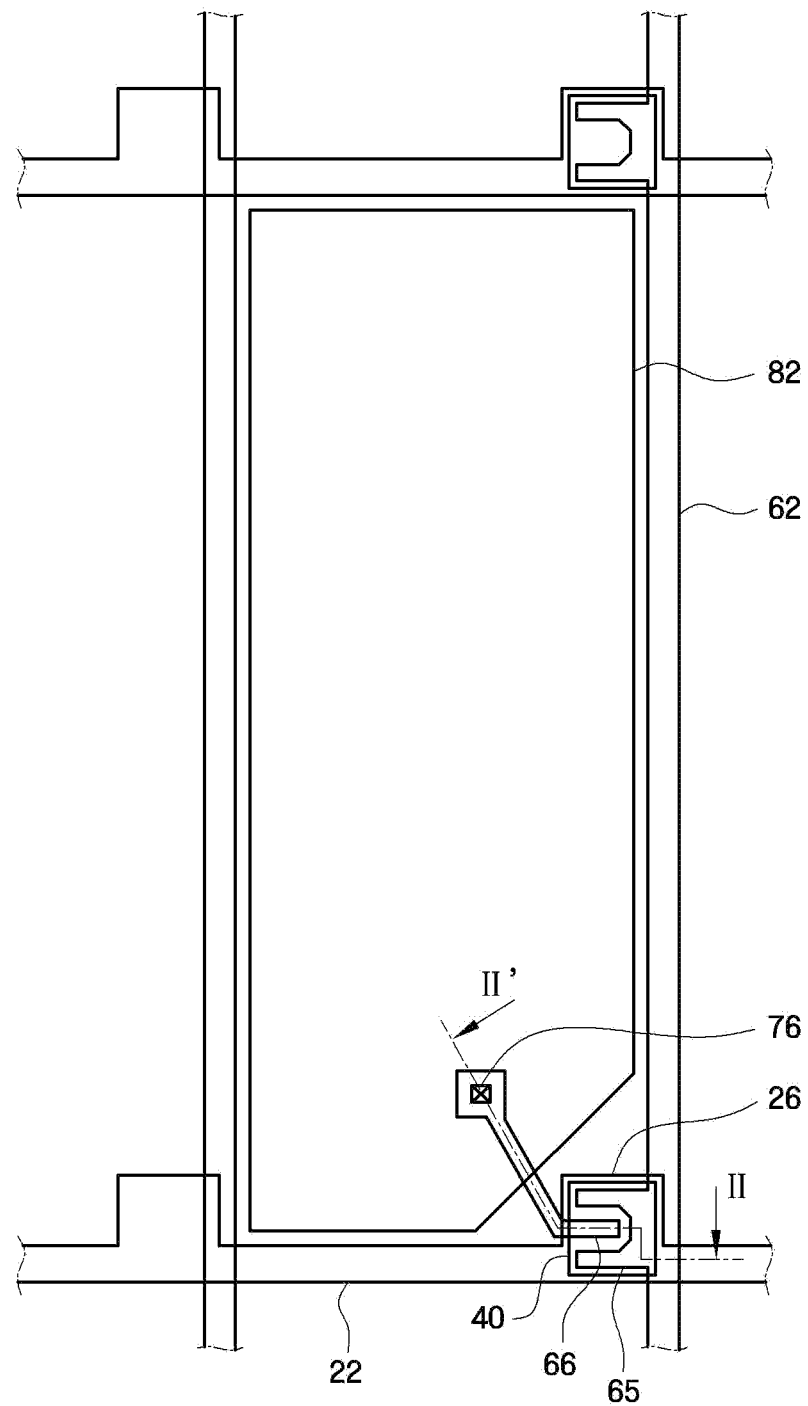
FIG. 1 is a plan view of a liquid crystal display (LCD) according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Spatially relative terms, such as "below," "beneath", "lower", "above", "upper", and the like, may be used herein for ease of description to describe one element or feature's relationship to another element(s) or feature(s) as shown in the figures.

Figure 2:
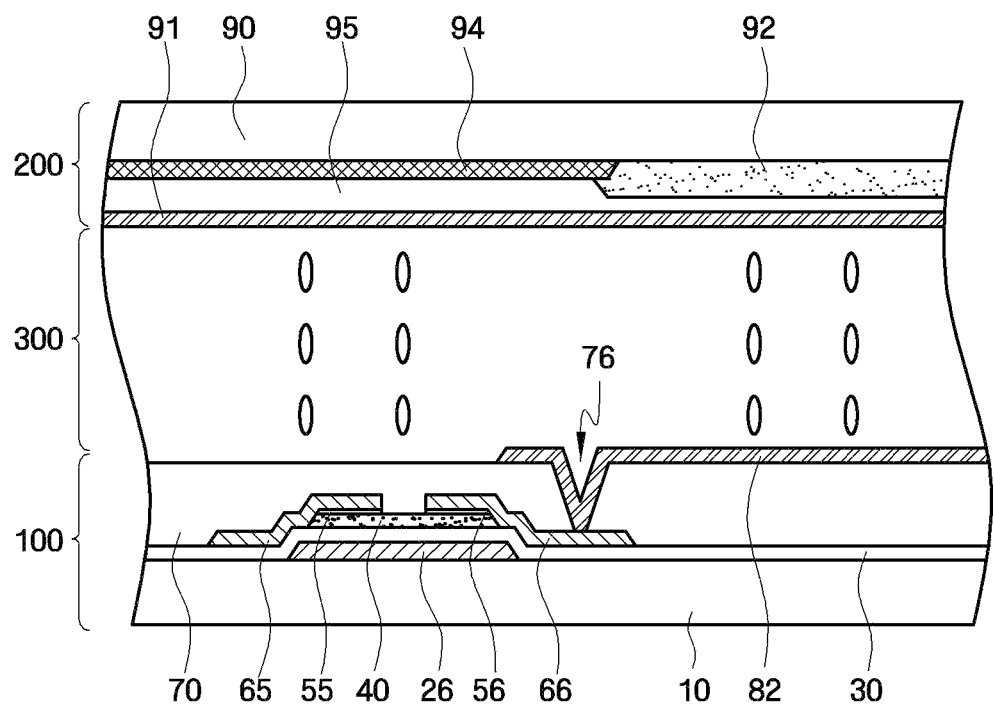
FIG. 2 is a cross-sectional view of the LCD taken along line II-II' of FIG. 1.

Hereinafter, a liquid crystal display (LCD) according to a first exemplary embodiment of the present invention will be described in detail with reference to FIG. 1 and FIG. 2. FIG. 1 is a plan view of the LCD according to the first exemplary embodiment of the present invention. FIG. 2 is a cross-sectional view of the LCD taken along line II-II' of FIG. 1.

Referring to a lower display panel 100 of the LCD shown in FIG. 1 and FIG. 2, a gate line 22 is disposed on a first insulating substrate 10, which may be made of transparent glass. The gate line 22 generally extends in a horizontal direction and delivers a gate signal. In addition, the gate line 22 is allocated to each pixel. The gate line 22 has a protruding gate electrode 26. The gate line 22 and the gate electrode 26 are collectively referred to as gate wiring.

The gate wiring may be made of aluminum (Al)-based metal, such as Al or Al alloys, silver (Ag)-based metal such as Ag or Ag alloys, copper (Cu)-based metal such as Cu or Cu alloys, molybdenum (Mo)-based metal such as Mo or Mo alloys, chrome (Cr), titanium (Ti), or tantalum (Ta).

In addition, the gate wiring may have a multi-layer structure composed of two conductive layers (not shown) having different physical characteristics. In this case, one of the two conductive layers may be made of metal with low resistivity, such as Al-based metal, Ag-based metal, or Cu-based metal, in order to reduce a signal delay or a voltage drop of the gate wiring. Alternatively, the other one of the conductive layers may be made of a different material, in particular, a material having superior contact characteristics with indium tin oxide (ITO) and indium zinc oxide (IZO), such as Mo-based metal, Cr, Ti, or Ta. Examples of the multi-layer structure include a combination of a Cr lower layer and an Al upper layer and a combination of an Al lower layer and a Mo upper layer. However, the present invention is not limited thereto. The gate wiring may be made of various metals and conductors.

A gate insulating film 30, which may be made of silicon nitride ($SiN_x$), is disposed on the gate line 22 and gate electrode 26.

A semiconductor layer 40, which may be made of hydrogenated amorphous silicon or polycrystalline silicon, is disposed on the gate insulating film 30. The semiconductor layer 40 may have various shapes. For example, the semiconductor layer 40 may be shaped like an island or may be linear. In the present exemplary embodiment, the semiconductor layer 40 is shaped like an island.

Ohmic contact layers 55 and 56 may be made of a material, such as silicide or n+ hydrogenated amorphous silicon, which is doped with n-type impurities in high concentration, and are disposed on the semiconductor layer 40. The ohmic contact layers 55 and 56 are arranged in pairs on the semiconductor layer 40.

A data line 62 and a drain electrode 66, which corresponds to the data line 62, are disposed on the ohmic contact layers 55 and 56 and the gate insulating film 30.

The data line 62 generally extends in a vertical direction to cross the gate line 22 and deliver a data voltage. A source electrode 65 extends from the data line 62 toward the drain electrode 66. The data line 62 delivers a data signal to a pixel electrode 82. The data line 62, the source electrode 65, and the drain electrode 66 are collectively referred to as the data wiring.

The data wiring may be made of Cr, Mo-based metal, or refractory metal such as Ta and Ti. In addition, the data wiring may have a multi-layer structure composed of a lower layer (not shown), which is made of refractory metal, and an upper layer (not shown) which is made of a material with low resistivity and disposed on the lower layer. As described above, examples of the multi-layer structure may include a combination of a Cr lower layer and an Al upper layer and a combination of an Al lower layer and a Mo upper layer. Alternatively, the multi-layer structure may be a triple-layer structure having Mo—Al—Mo layers.

The source electrode 65 at least partially overlaps the semiconductor layer 40. In addition, the drain electrode 66 faces the source electrode 65 on the gate electrode 26 and at least partially overlaps the semiconductor layer 40. The ohmic contact layers 55 and 56 described above are interposed between the semiconductor layer 40, which is disposed under the ohmic contact layers 55 and 56, and the source electrode 65 and the drain electrode 66, which are disposed on the ohmic contact layers 55 and 56, respectively. Thus, the ohmic contact layers 55 and 56 may reduce contact resistance between the semiconductor layer 40 and the source and drain electrodes 65 and 66, respectively.

A passivation layer 70 is disposed on the data wiring and an exposed portion of the semiconductor layer 40. The passivation layer 70 may be made of an inorganic material, such as silicon nitride ($SiN_x$) or silicon oxide ($SiO_x$), an organic material having photosensitivity and superior planarization characteristics, or a low-k dielectric material formed by plasma enhanced chemical vapor deposition (PECVD), such as a-Si:C:O or a-Si:O:F. The passivation layer 70 may be composed of a lower inorganic layer and an upper organic layer in order to protect the exposed portion of the semiconductor layer 40 while taking advantage of the superior characteristics of an organic layer. Furthermore, a red (R), green (G), or blue (B) color filter may be used as the passivation layer 70.

A contact hole 76 is formed in the passivation layer 70. The pixel electrode 82 is connected to the drain electrode 66 through the contact hole 76. Therefore, the pixel electrode 82 receives a data voltage and a control voltage from the drain electrode 66.

The pixel electrode 82, to which the data voltage is applied, generates an electric field together with a common electrode 91 of an upper display panel 200, thereby determining the alignment of liquid crystals between the pixel electrode 82 and the common electrode 91.

An alignment film (not shown), which can align a liquid crystal layer 300, may be coated on the pixel electrode 82 and the passivation layer 70.

Referring to the upper display panel 200 of the LCD shown in FIG. 1 and FIG. 2, a black matrix 94 to prevent the leakage of light and define a pixel region is disposed on a second insulating substrate 90, which may be made of transparent glass. The black matrix 94 may be disposed on portions of the second insulating substrate 90, which correspond to the gate line 22 and the data line 62, and a portion of the second insulating substrate 90, which corresponds to a thin-film transistor (TFT). In addition, the black matrix 94 may have various shapes in order to prevent the leakage of light in the vicinity of the pixel electrode 82 and the TFT. The black matrix 94 may be made of metal (metal oxide), such as chrome or chrome oxide, or organic black resist.

In addition, R, G, and B color filters 92 may be sequentially arranged in the pixel region between the black matrices 94. An overcoat layer 95 may be disposed on the R, G, and B color filters 92 to planarize their step heights.

The common electrode 91 may be made of a transparent conductive material, such as ITO or IZO, and disposed on the overcoat layer 95. The common electrode 91 faces the pixel electrode 82, and the liquid crystal layer 300 is disposed between the common electrode 91 and the pixel electrode 82.

An alignment film (not shown) to align the liquid crystals may be coated on the common electrode 91.

If the lower and upper display panels 100 and 200 structured as described above are arranged and then coupled to each other and a liquid crystal material is injected between the lower and upper display panels 100 and 200 to form the liquid crystal layer 300, a basic structure of the LCD according to the present exemplary embodiment is completed.

When a liquid crystal molecule is an optically uniaxial crystal, it exhibits anisotropy $\Delta n$ of a refractive index. That is, a uniaxial crystal molecule exhibits a refractive index $n_e$ for ordinary light, in which an electric vector of a light wave oscillates perpendicular to a plane on which an optical axis lies, and a refractive index $n_o$ for extraordinary light in which an electric vector oscillates parallel to a plane on which an optic axis lies.

In addition, the liquid crystal molecule has dielectric anisotropy, that is, it has different dielectric constants in directions parallel and perpendicular to a long axis thereof. In the present specification, a dielectric constant in the direction parallel to the long axis of the liquid crystal is defined as a horizontal dielectric constant $\in\|$, and a dielectric constant in the direction perpendicular to the long axis of the liquid crystal is defined as a vertical dielectric constant $\in\perp$. In addition, the difference between the vertical dielectric constant $\in\perp$ and the horizontal dielectric constant $\in\|$ is defined as dielectric anisotropy $\Delta\in$.

The liquid crystal composition, which makes up the liquid crystal layer 300, is a mixture of liquid crystal materials having various characteristics, and the mixture will be referred to as liquid crystals or a liquid crystal composition throughout the specification.

A kickback voltage $\Delta V_{kb}$ is one of contributing factors to the deterioration of display quality of the LCD. Since the kickback voltage $\Delta V_{kb}$ makes a voltage between the pixel electrode 82 and the common electrode 91 unstable, it should be reduced. The kickback voltage is defined by Equation (1) below.

$$\Delta V_{kb}=\Delta V_g \times C_{gs}/(C_{lc}+C_{gs}), \qquad (1)$$

$\Delta V_g$ is the range of fluctuation in a gate voltage $V_g$ when a TFT is turned off, $C_{gs}$ is a parasitic capacitance between the gate electrode 26 of the TFT and the data line 62, and $C_{lc}$ is a liquid crystal capacitance.

Referring to Equation (1), the liquid crystal capacitance $C_{lc}$ must be increased in order to reduce the kickback voltage $\Delta V_{kb}$. That is, the liquid crystal capacitor $C_{lc}$ must be increased in order to reduce the kickback voltage $\Delta V_{kb}$ without additionally implementing a storage capacitor. In order to increase the liquid crystal capacitance $C_{lc}$, the dielectric constant of liquid crystals must be increased.

A ratio $\Delta\in/\in\perp$ of the dielectric anisotropy $\Delta\in$ to the vertical dielectric constant $\in\perp$ of liquid crystals according to the present exemplary embodiment may be 0.5 or less. In addition, rotational viscosity $\gamma 1$ of the liquid crystals may be 90 to 110 mPa·S. Here, the ratio $\Delta\in/\in\perp$ of the dielectric anisotropy $\Delta\in$ to the vertical dielectric constant $\in\perp$ affects the kickback voltage $\Delta V_{kb}$ generated by the parasitic capacitance $C_{gs}$ of the TFT, which, in turn, affects the display quality of the LCD. Furthermore, the rotational viscosity $\gamma 1$ affects the response time of the liquid crystals. Since the ratio $\Delta\in/\in\perp$ of the dielectric anisotropy $\Delta\in$ to the vertical dielectric constant $\in\perp$ has a kind of trade-off relationship with the rotational viscosity $\gamma 1$, the liquid crystals must satisfy the above conditions in order to achieve superior display quality and fast response time. To this end, the liquid crystals may contain approximately 10 to 30 weight % of an alkenyl.

Elements, such as a polarizer (not shown) and a backlight (not shown), are arranged in the above basic structure to complete the LCD. For example, a polarizer may be installed on each of both sides of the basic structure. Specifically, an axis of one polarizer may be disposed parallel to the gate line 22, and an axis of the other polarizer may be disposed perpendicular to the gate line 22.

Figure 3:
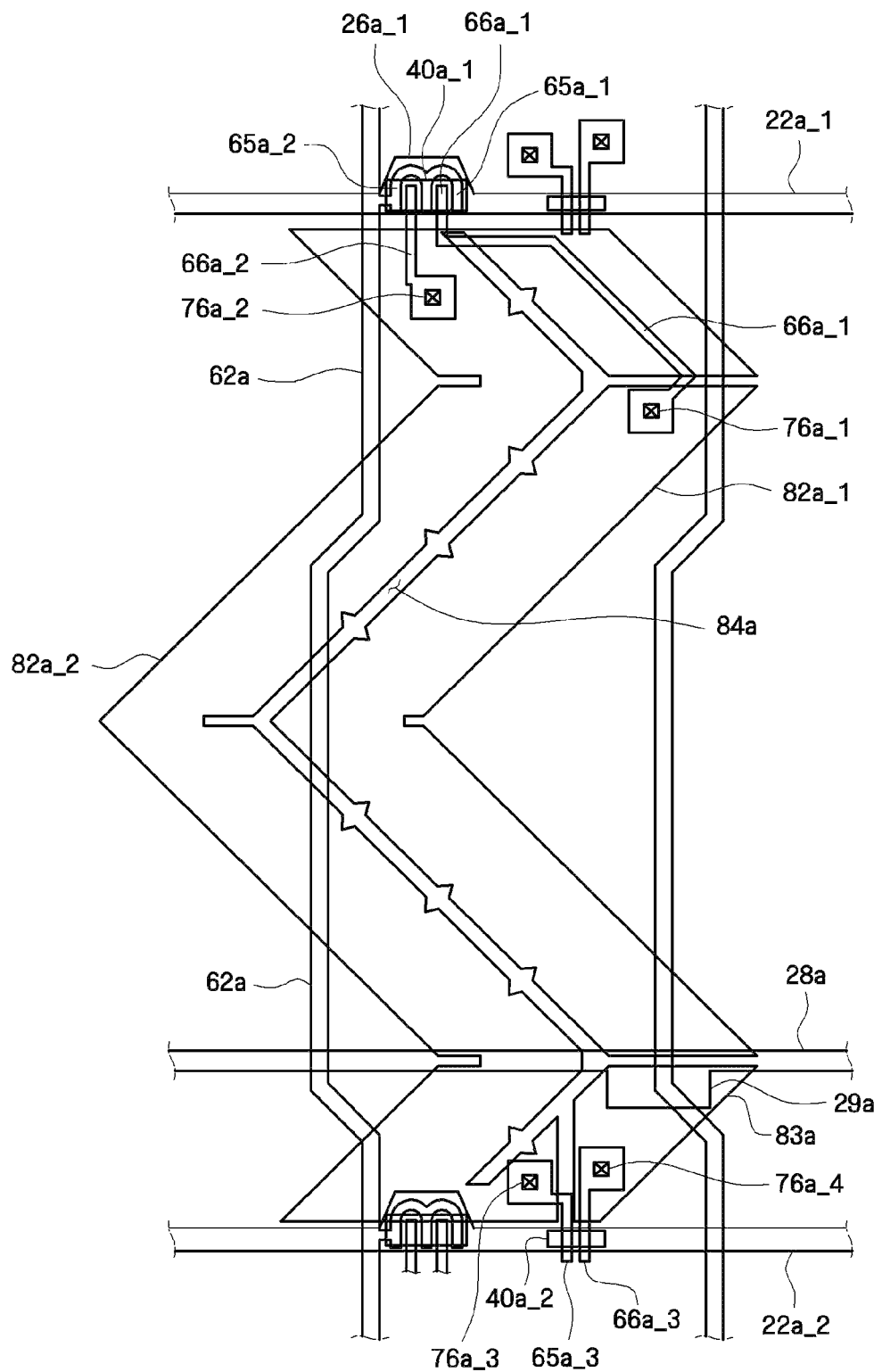
FIG. 3 is a plan view of a lower display panel included in an LCD according to a second exemplary embodiment of the present invention.
Figure 4:
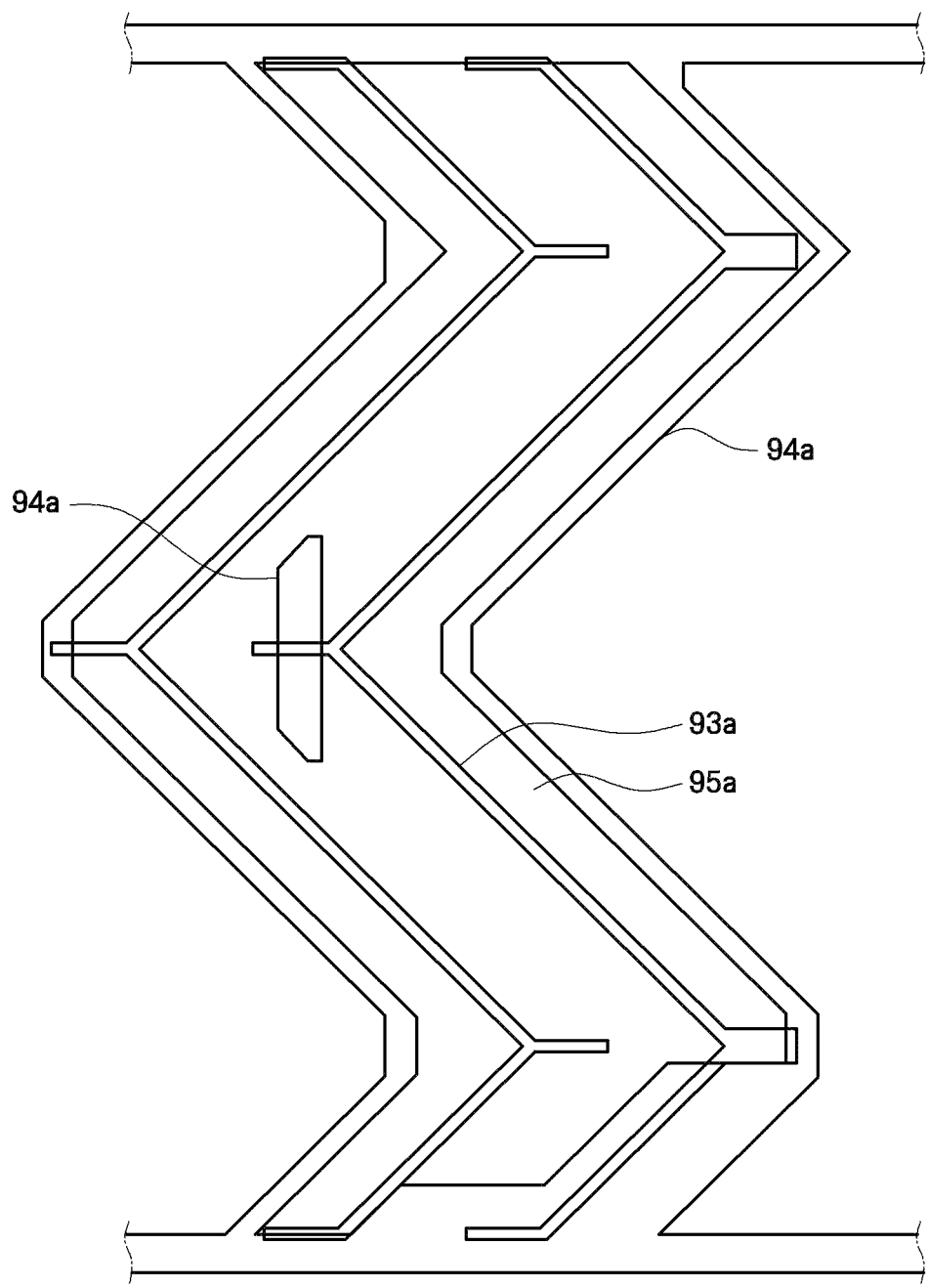
FIG. 4 is a plan view of an upper display panel included in the LCD according to the second exemplary embodiment of the present invention.
Figure 5:
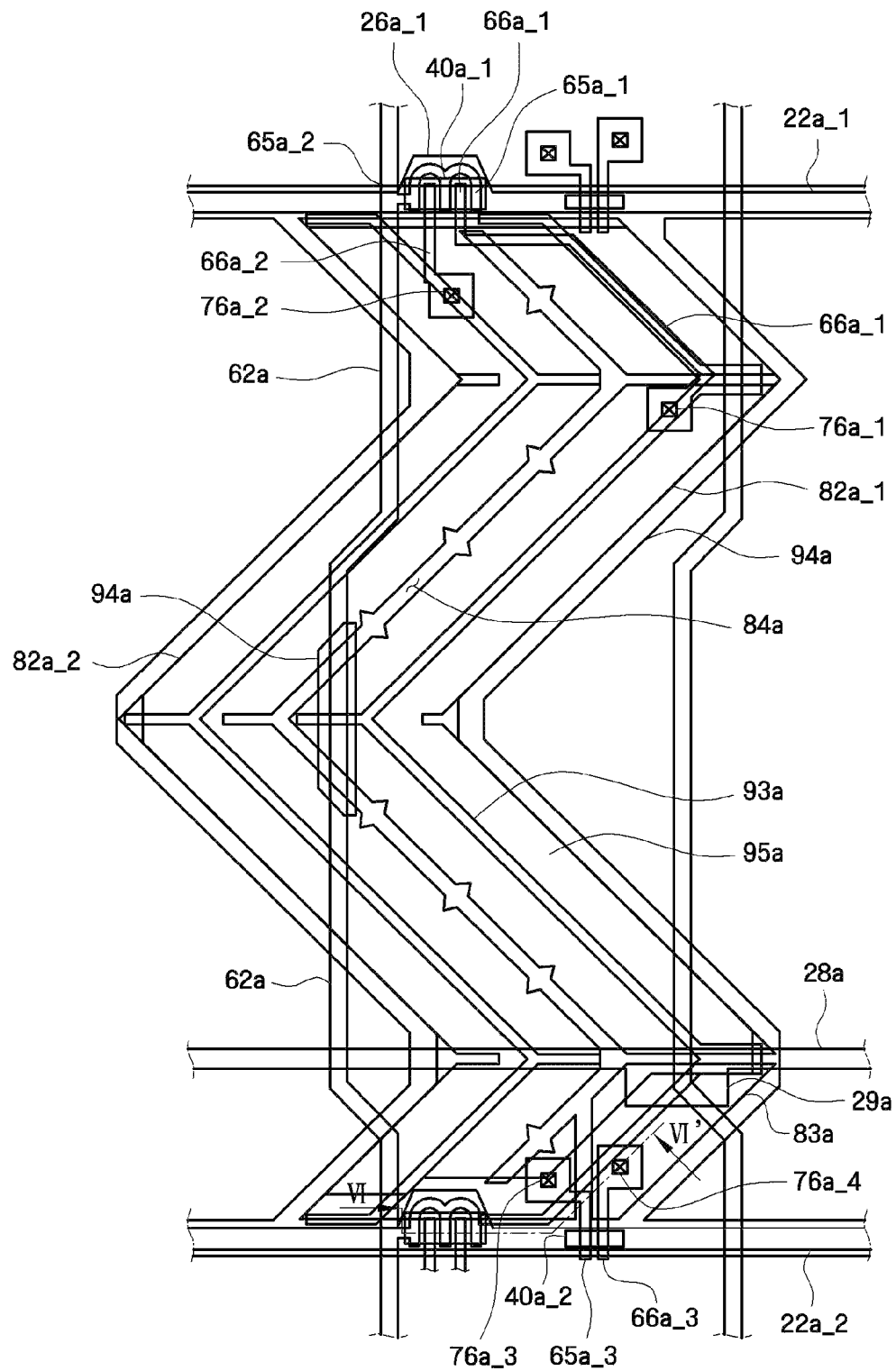
FIG. 5 is a plan view of the LCD according to the second exemplary embodiment of the present invention.
Figure 6:
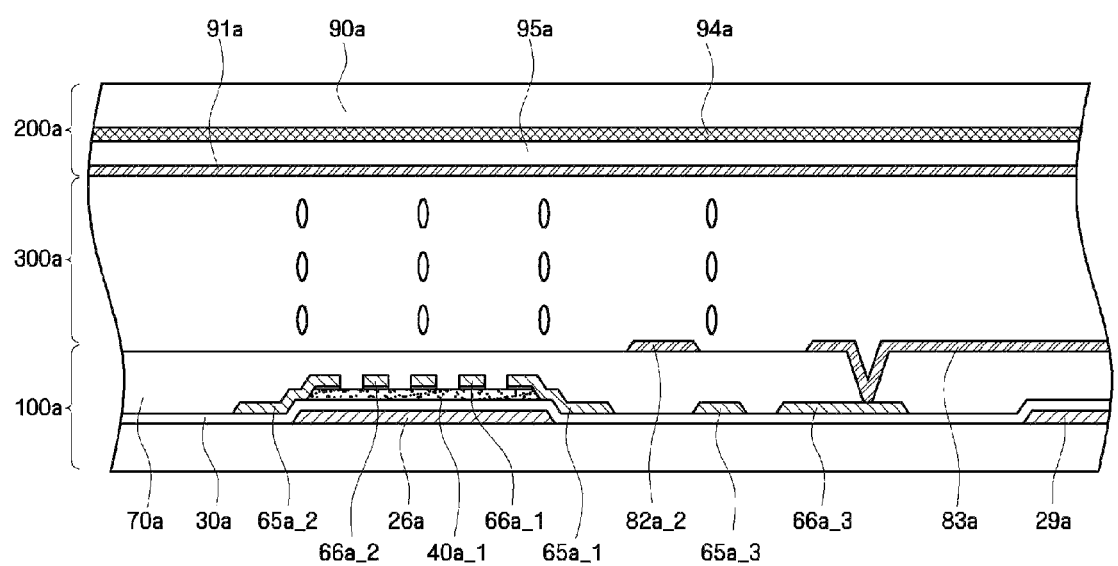
FIG. 6 is a cross-sectional view of the LCD of FIG. 5 taken along line VI-VI'.
Figure 7:
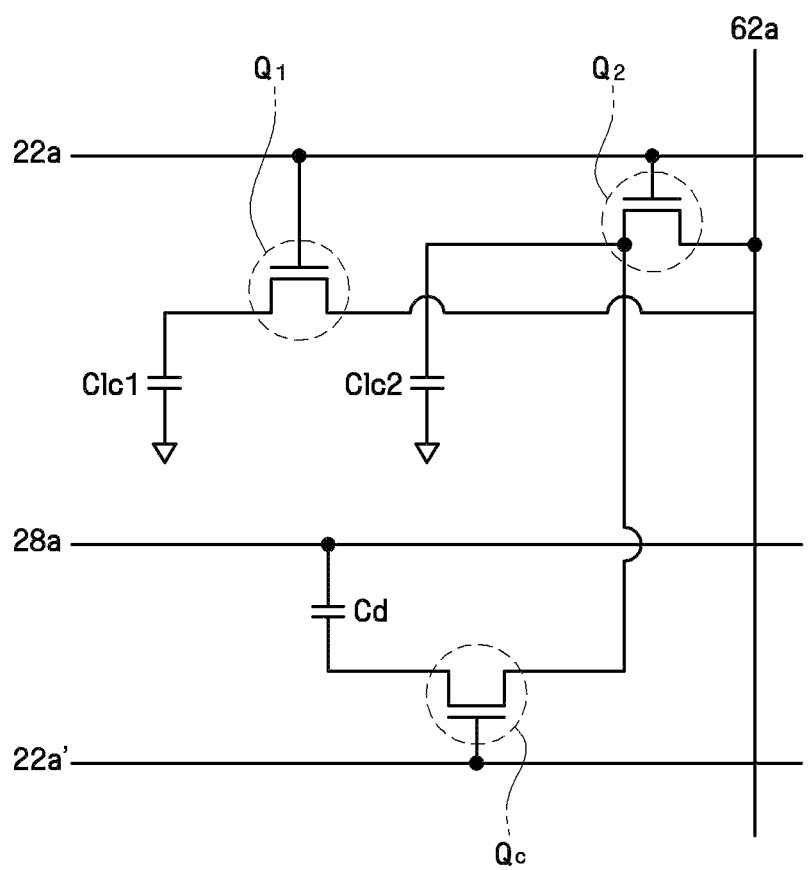
FIG. 7 is an equivalent circuit diagram of a pixel included in the LCD of FIG. 5.

Hereinafter, an LCD according to a second exemplary embodiment of the present invention will be described in detail with reference to FIG. 3, FIG. 4, FIG. 5, FIG. 6, and FIG. 7. FIG. 3 is a plan view of a lower display panel 100*a* included in the LCD according to the second exemplary embodiment of the present invention. FIG. 4 is a plan view of an upper display panel 200*a* included in the LCD according to the second exemplary embodiment of the present invention. FIG. 5 is a plan view of the LCD according to the second exemplary embodiment of the present invention. FIG. 6 is a cross-sectional view of the LCD of FIG. 5 taken along line VI-VI' of FIG. 5. FIG. 7 is an equivalent circuit diagram of a pixel included in the LCD of FIG. 5

Referring to FIG. 3, FIG. 4, FIG. 5, FIG. 6, and FIG. 7, each pixel of the LCD according to the second exemplary embodiment of the present invention includes three TFTs and two pixel electrodes. That is, each pixel includes first, second, and third TFTs $Q_1$, $Q_2$, and Qc and first and second subpixel electrodes 82*a*_1 and 82*a*_2. The first TFT $Q_1$ drives the first subpixel electrode 82*a*_1, and the second TFT $Q_2$ drives the second subpixel electrode 82*a*_2. The third TFT Qc is connected to the second subpixel electrode 82*a*_2 and a first control electrode 83a and changes a voltage applied to the second subpixel electrode 82a_2.

The lower display panel 100a includes a first gate line 22a_1, a second gate line 22a_2, and a data line 62a. The first and second gate lines 22a_1 and 22a_2 horizontally extend parallel to each other on a first insulating substrate. The data line 62a crosses the first and second gate lines 22a_1 and 22a_2. A first gate electrode 26a_1 and a second gate electrode 26a_2 are formed in the first and second gate lines 22a_1 and 22a_2, respectively. A first semiconductor island 40a_1 and a second semiconductor island 40a_2 are formed on first gate electrode 26a_1 and a second gate electrode 26a_2, respectively A first source electrode 65a_1, which corresponds to an input terminal of the first TFT $Q_1$, branches off from the data line 62a and is disposed on the first gate electrode 26a_1. A second source electrode 65a_2 corresponds to an input terminal of the second TFT $Q_2$, branches off from the data line 62a, and is disposed on the first gate electrode 26a_1. The first and second source electrodes 65a_1 and 65a_2 are adjacent to each other and are switched on or off by the first gate line 22a_1.

A third source electrode 65a_3, which corresponds to an input terminal of the third TFT Qc, is disposed on the second gate electrode 26a_2 and connected to the second subpixel electrode 82a_2 through a third contact hole 76a_3.

A first drain electrode 66a_1 is connected to the first subpixel electrode 82a_1 through a first contact hole 76a_1, and a second drain electrode 66a_2 is connected to the second subpixel electrode 82a_2 through a second contact hole 76a_2. A third drain electrode 66a_3 is connected to the first control electrode 83a through a fourth contact hole 76a_4.

The first control electrode 83a overlaps a second control electrode 29a to form a control capacitor Cd. The second control electrode 29a branches off from a control line 28a, which extends parallel to the first and second gate lines 22a_1 and 22a_2. The first control electrode 83a and the second control electrode 29a may overlap a black matrix 94a. The first control electrode 83a, the first and second subpixel electrodes 82a_1 and 82a_2 may be on the same layer. In addition, the second control electrode 29a, the first and second gate lines 22a_1 and 22a_2 may be on the same layer.

The first and second subpixel electrodes 82a_1 and 82a_2 may be bent in a zigzag manner. The first and second subpixel electrodes 82a_1 and 82a_2 are spaced from each other by a slit 84a, which is a domain partition portion. The domain partition portion is not limited to the slit 82a and may alternatively be a protrusion.

The first and second subpixel electrodes 82a_1 and 82a_2 may be bent at an angle of approximately −45 to +45 degrees with respect to the first and second gate lines 22a_1 and 22a_2.

A liquid crystal layer 300a including liquid crystals is disposed between the upper display panel 200a and the lower display panel 100a. In this case, a ratio $\Delta\in/\in\perp$ of the dielectric anisotropy $\Delta\in$ to the vertical dielectric constant $\in\perp$ of the liquid crystals may be 0.5 or less. In addition, the rotational viscosity γ1 of the liquid crystals may be 90 to 110 mPa·S. In order to obtain these characteristics, the liquid crystals may contain approximately 10 to 30 weight % of an alkenyl.

Referring to FIG. 7, the pixel includes first and second gate lines 22a and 22a' and a data line 62a that crosses the first and second gate lines 22a and 22a'. In addition, the pixel includes first, second, and third TFTs Q1, Q2, and Qc. Gate electrodes of the first and second TFTs Q1 and Q2 are connected to the first gate line 22a, and a gate electrode of the third TFT Qc is connected to the second gate line 22a'. The second gate line 22a' may be an independent line or a line that is connected to gate electrodes of first and second TFTs (not shown) of an adjacent pixel.

While input terminals of the first and second TFTs $Q_1$ and $Q_2$ are connected to the data line 62a, an input terminal of the third TFT Qc is connected to an output terminal of the second TFT $Q_2$. Output terminals of the first and second TFTs $Q_1$ and $Q_2$ are connected to the first and second subpixel electrodes 82a_1 and 82a_2, respectively, in order to apply specified voltages to the liquid crystal layer 300a. That is, the first TFT $Q_1$ is connected to the first subpixel electrode 82a_1 to form a first liquid crystal capacitor Clc1, and the second TFT $Q_2$ is connected to the second subpixel electrode 82a_2 to form a second liquid crystal capacitor Clc2. A common electrode 91a faces the first and second subpixel electrodes 82a_1 and 82a_2, and a common voltage Vcom is applied to the common electrode 91a.

The input terminal of the third TFT Qc is connected to the second subpixel electrode 82a_2, which is the output terminal of the second TFT $Q_2$. An output terminal of the third TFT Qc is connected to the first control electrode 83a and forms a control capacitor Cd together with the second control electrode 29a.

The control capacitor Cd uses the control line 28a as one of its electrodes, and a fixed voltage is applied to the control line 28a. In this case, the fixed voltage may be the common voltage Vcom.

When the first and second TFTs $Q_1$ and $Q_2$ are turned on, the first liquid crystal capacitor Clc1 is formed between the first subpixel electrode 82a_1 and the common electrode 91a, and the second liquid crystal capacitor Clc2 is formed between the second subpixel electrode 82a_2 and the common electrode 91a. When the third TFT Qc is turned on, the control capacitor Cd changes the difference of voltage applied to the second liquid crystal capacitor Clc2, which results in the difference between the voltages charged in the first and second liquid crystal capacitors Clc1 and Clc2.

Figure 8:
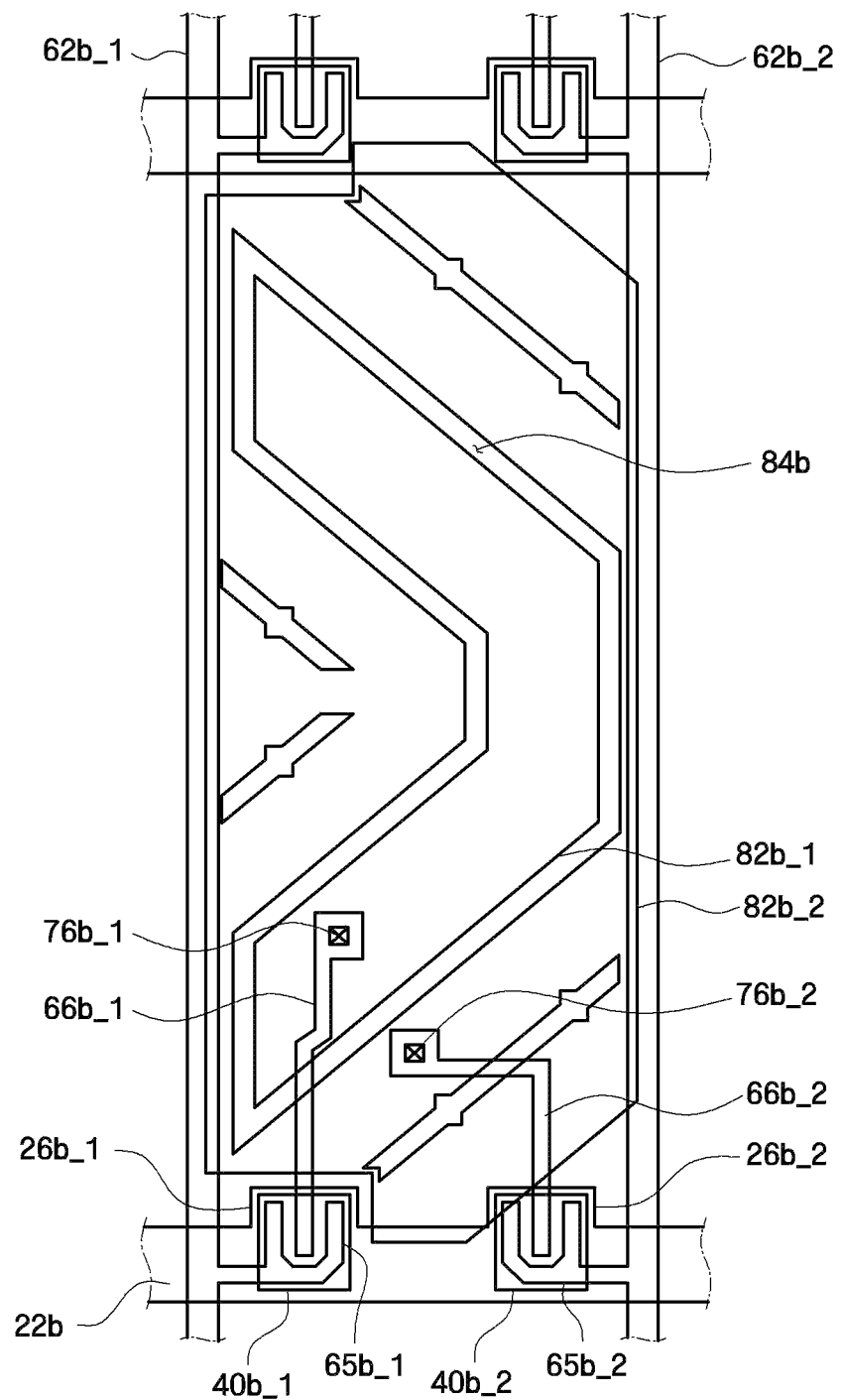
FIG. 8 is a plan view of a lower display panel included in an LCD according to a third exemplary embodiment of the present invention.

Hereinafter, an LCD according to a third exemplary embodiment of the present invention will be described in detail with reference to FIG. 8. FIG. 8 is a plan view of a lower display panel included in the LCD according to the third exemplary embodiment of the present invention.

Referring to FIG. 8, first and second data lines 62b_1 and 62b_2 cross gate wiring. The first data line 62b_1 delivers a first data voltage to a first subpixel electrode 82b_1 and the second data line 62b_2 delivers a second data voltage to a second subpixel electrode 82b_2.

The first subpixel electrode 82b_1 is connected to a gate line 22b and the first data line 62b_1 by a switching element to receive a gate signal and the first data voltage. The switching element connected to the first subpixel electrode 82b_1 may be a TFT including gate electrode 26b_1, source electrode 65b_1, drain electrode 66b_1, and semiconductor layer 40b_1. The drain electrode 66b_1 is connected to the first subpixel electrode 82b_1 via contact hole 76b_1. The second subpixel electrode 82b_2 is connected to the gate line 22b and the second data line 62b_2 by a second switching element to receive the gate signal and the second data voltage. The switching element connected to the second subpixel electrode 82b_2 may be a TFT including gate electrode 26b_2, source electrode 65b_2, drain electrode 66b_2, and semiconductor layer 40b_2. The drain electrode 66b_2 is connected to the second subpixel electrode 82b_2 via contact hole 76b_2. In this case, the first data voltage may be relatively higher than a common voltage, and the second data voltage may be relatively lower than the common voltage.

A relatively high data voltage is applied to the first subpixel electrode 82b_1, and a relatively low data voltage is applied to the second subpixel electrode 82b_2.

At a low grayscale level, liquid crystals arranged on the second subpixel electrode 82b_2, to which a relatively low data voltage is applied, are aligned such that their directors are perpendicular to the lower display panel. Thus, light emitted from a backlight (not shown) cannot pass through the second subpixel electrode 82b_2.

In this regard, if the second subpixel electrode 82b_2 overlaps the first and second data lines 62a_1 and 62b_2, it may block light, which is generated around the first and second data lines 62b_1 and 62b_2, at a low grayscale level, which may prevent leakage of the light.

The first subpixel electrode 82b_1 may be shaped like English character 'V' which is rotated 90 degrees in a counterclockwise direction or may be surrounded by the second subpixel electrode 82b_2. The first and second subpixel electrodes 82b_1 and 82b_2 are separated from each other by a slit 84b, and the slit 84b may be at an angle of approximately −45 to +45 degrees with respect to the gate line 22b.

An upper display panel (not shown) is installed to face the lower display panel described above, and a liquid crystal layer containing liquid crystals is disposed between the upper and low display panels to complete the LCD. In this case, a ratio $\Delta\in/\in\perp$ of the dielectric anisotropy $\Delta\in$ to the vertical dielectric constant $\in\perp$ of the liquid crystals may be 0.5 or less. In addition, rotational viscosity γ1 of the liquid crystals may be 90 to 110 mPa·S.

The LCD described above can maintain superior display quality without requiring a storage wiring. In addition, since the storage wiring is omitted from the LCD, the aperture ratio thereof may be increased.

Figure 9:
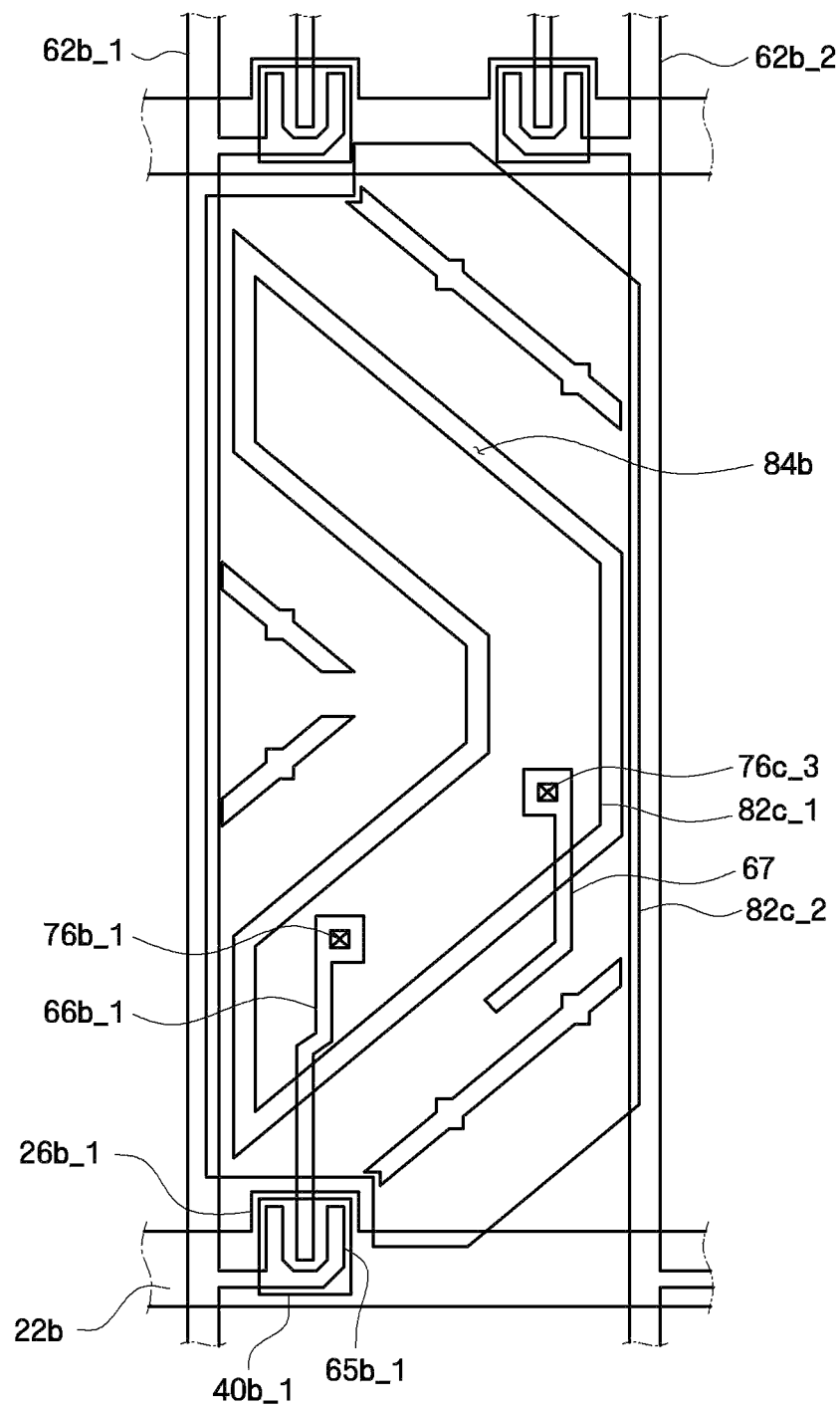
FIG. 9 is a plan view of a lower display panel included in an LCD according to a fourth exemplary embodiment of the present invention.

Hereinafter, an LCD according to a fourth exemplary embodiment of the present invention will be described in detail with reference to FIG. 9. FIG. 9 is a plan view of a lower display panel included in the LCD according to the fourth exemplary embodiment of the present invention.

Referring to FIG. 9, the LCD according to the fourth exemplary embodiment of the present invention includes first and second subpixel electrodes 82c_1 and 82c_2 and a coupling electrode 67.

The first and second subpixel electrodes 82c_1 and 82c_2 are spaced apart from each other by a slit 84b, which is a domain partition portion, and are insulated from each other. In addition, the first and second subpixel electrodes 82c_1 and 82c_2 engage with each other to form a pixel region. The first subpixel electrode 82c_1 is connected to a TFT and receives a data voltage directly from the TFT. A lower data voltage is applied to the second subpixel electrode 82c_2 than to the first subpixel electrode 82c_1 by a 'coupling capacitor,' which is composed of the first subpixel electrode 82c_1 and the coupling electrode 67.

Each pixel electrode may be cut obliquely at an angle of approximately −45 to +45 degrees with respect to a gate line 22b and thus partitioned into the first and second subpixel electrodes 82c_1 and 82c_2. Therefore, liquid crystals within each pixel may tilt in four directions, thereby securing visibility in the four directions. This arrangement of the first and second subpixel electrodes 82c_1 and 82c_2 is a mere exemplary embodiment of the present invention. That is, each pixel electrode may be partitioned in various ways. When necessary, each pixel electrode may be partitioned into three or more subpixel electrodes.

The first and second subpixel electrodes 82c_1 and 82c_2 are coupled to each other and operate accordingly. That is, the coupling electrode 67, which is connected to the first subpixel electrode 82c_1 via contact hole 76c_3, and the second subpixel electrode 82c_2 are insulated from each other by a dielectric interposed therebetween and overlap each other to form a 'coupling capacitor.' For this reason, if a data voltage is applied to the first subpixel electrode 82c_1, a voltage lower than the data voltage applied to the first subpixel electrode 82c_1 is applied to the second subpixel electrode 82c_2.

The coupling electrode 67 does not have to be connected to the first subpixel electrode 82c_1. The coupling electrode 67 may alternatively be connected to the second subpixel electrode 82c_2. That is, if a coupling electrode, which is connected to a second subpixel electrode, and a first subpixel electrode overlap each other and thus form a 'coupling capacitor,' when a data voltage is applied to the second subpixel electrode, a lower voltage may be applied to the first subpixel electrode.

The LCD structured as described above includes a liquid crystal layer whose ratio $\Delta\in/\in\perp$ of the dielectric anisotropy $\Delta\in$ to the vertical dielectric constant $\in\perp$ may be 0.5 or less and whose rotational viscosity γ1 may be 90 to 110 mPa·S. Thus, the LCD can maintain superior display quality in a stable manner without requiring a storage wiring.

Figure 10:
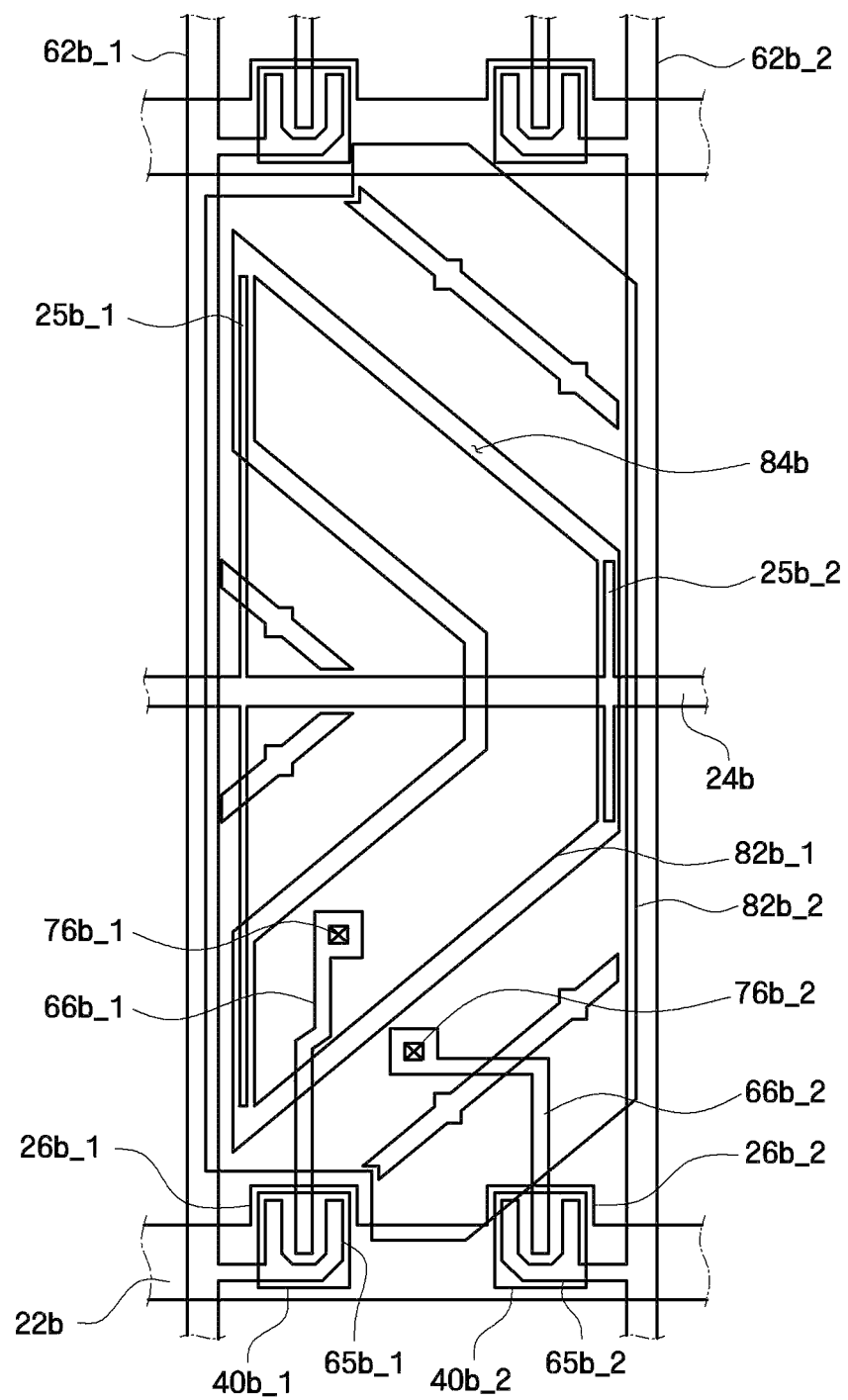
FIG. 10 is a plan view of a lower display panel included in an LCD according to a fifth exemplary embodiment of the present invention.

Hereinafter, an LCD according to a fifth exemplary embodiment of the present invention will be described in detail with reference to FIG. 10. FIG. 10 is a plan view of a lower display panel included in the LCD according to the fifth exemplary embodiment of the present invention.

Referring to FIG. 10, a decoupling line 24b crosses first and second subpixel electrodes 82b_1 and 82b_2 and extends substantially parallel to a gate line 22b. The decoupling line 24b delivers a decoupling voltage to a first decoupling electrode 25b_1 and a second decoupling electrode 25b_2. The decoupling line 24b may be used to repair defective pixel electrodes. For example, if the first subpixel electrode 82b_1 is defective, the first subpixel electrode 82b_1 and the decoupling line 24b may be made to short-circuit by laser welding. Then, a corresponding pixel may become an 'off' pixel.

The decoupling line 24b may be on the same layer as the gate wiring and may have a width of 5 to 15 µm. Decoupling capacitance may be 5 to 20% of liquid capacitance. That is, the capacitance of a capacitor, which is formed by the overlapping of the decoupling line 24b with the first subpixel electrode 82b_1 or the second subpixel electrode 82b_2, may be reduced to such an extent that the capacitor substantially cannot function as a storage capacitor. The capacitance of the decoupling line 24b may be sufficient to allow it to function as wiring that applies a voltage to the first and second decoupling electrodes 25b_1 and 25b_2. The capacitance of the decoupling line 24b may be 10% or less of the liquid capacitance.

First and second data lines 62b_1 and 62b_2 cross the gate wiring. The first data line 62b_1 delivers a first data voltage to the first subpixel electrode 82b_1, and the second data line 62b_2 delivers a second data voltage to the second subpixel electrode 82b_2.

The first subpixel electrode 82b_1 is connected to the gate line 22b and the first data line 62b_1 by a switching element to receive a gate signal and the first data voltage. The second subpixel electrode 82b_2 is connected to the gate line 22b and the second data line 62b_2 by a switching element to receive the gate signal and the second data voltage. In this case, the first data voltage may be relatively higher than a common voltage, and the second data voltage may be relatively lower than the common voltage.

A relatively high data voltage is applied to the first subpixel electrode 82b_1, and a relatively low data voltage is applied to the second subpixel electrode 82b_2. At a low grayscale level, liquid crystals arranged on the second subpixel electrode 82b_2, to which a relatively low data voltage is applied, are aligned such that their directors are perpendicular to the lower display panel. Thus, light emitted from a backlight (not shown) cannot pass through the second subpixel electrode 82b_2.

In this regard, if the second subpixel electrode 82b_2 overlaps the first and second data lines 62b_1 and 62b_2, it blocks light, which is generated around the first and second data lines 62b_1 and 62b_2, at a low grayscale level, which may prevent leakage of the light.

The first and second decoupling electrodes 25b_1 and 25b_2 are connected to the decoupling line 24b to receive a decoupling voltage from the decoupling line 24b. The first and second decoupling electrodes 25b_1 and 25b_2 prevent the first subpixel electrode 82b_1 from being coupled to the first and second data lines 62b_1 and 62b_2, respectively. The first and second decoupling electrodes 25b_1 and 25b_2 are arranged parallel to the first and second data lines 62b_1 and 62b_2 and extend between the first subpixel electrode 82b_1 and the first and second data lines 62b_1 and 62b_2, respectively.

The first and second decoupling electrodes 25b_1 and 25b_2 prevent leakage of light between the first and second subpixel electrodes 82b_1 and 82b_2 and the first and second data lines 62b_1 and 62b_2. When necessary, the first and second decoupling electrodes 25b_1 and 25b_2 may partially overlap the first subpixel electrode 82b_1, the second subpixel electrode 82b 2, the first data line 62b_1, or the second data line 62b_2. The first and second decoupling electrodes 25b_1 and 25b_2 may reduce the difference between the coupling capacitance of the first subpixel electrode 82b_1 and the first data line 62b_1 and that of the first subpixel electrode 82b_1 and the second data line 62b_2.

Figure 11:
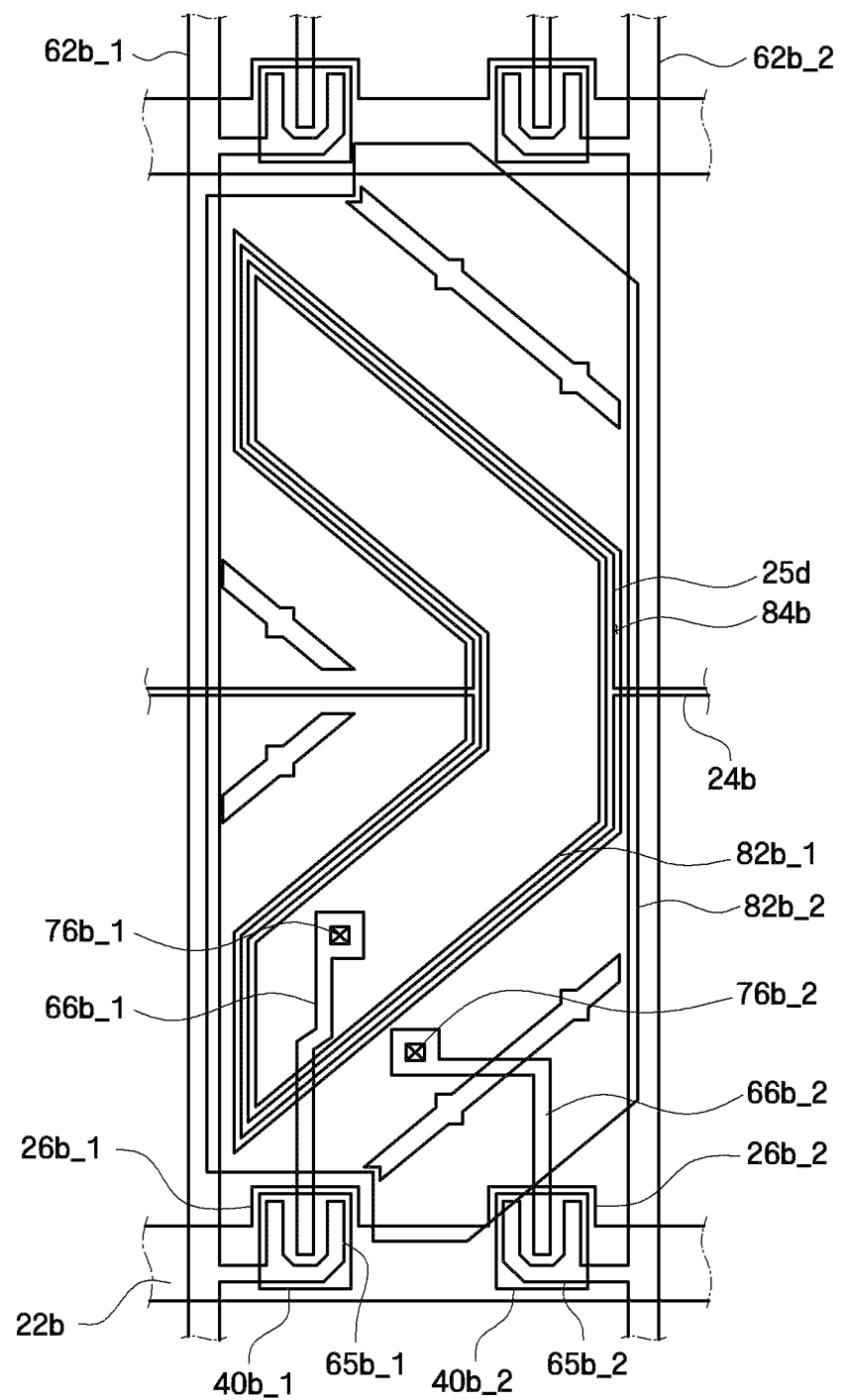
FIG. 11 is a plan view of a lower display panel included in an LCD according to a sixth exemplary embodiment of the present invention.

Hereinafter, an LCD according to a sixth exemplary embodiment of the present invention will be described in detail with reference to FIG. 11. FIG. 11 is a plan view of a lower display panel included in the LCD according to the sixth exemplary embodiment of the present invention.

The LCD according to the sixth exemplary embodiment of the present invention includes a decoupling electrode 25d, which overlaps a slit 84b between first and second subpixel electrodes 82b_1 and 82b_2. The first subpixel electrode 82b_1 is surrounded by the second subpixel electrode 82b 2 and spaced apart from the second subpixel electrode 82b_2 by the slit 84b. The slit 84b may be at an angle of approximately −45 to +45 degrees with respect to a gate line 22b. The decoupling electrode 25d is connected to a decoupling electrode of an adjacent pixel by a decoupling line 24b.

In order to increase the overall pixel aperture ratio, the decoupling line 25d may extend parallel to the gate line 22b and across the center of the second subpixel electrode 82b_2. In addition, the decoupling line 25d may not overlap the first subpixel electrode 82b_1. That is, the decoupling line 25d may be shaped like a hollow trapezoid or English character 'V', which lies laterally and has an empty space therein, and may be disposed parallel to the first subpixel electrode 82b_1.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD), comprising:
a first display panel;
a second display panel facing the first display panel; and
a liquid crystal composition disposed between the first display panel and the second display panel,
a first gate line disposed on the first display panel;
a data line that crosses the first gate line;
a first subpixel electrode disposed on the first display panel and connected to the first gate line by a first switching element; and
a second subpixel electrode disposed on the first display panel, spaced apart from the first subpixel electrode, and connected to the first gate line by a second switching element,
wherein the first subpixel electrode and the second subpixel electrode are bent in a zigzag manner,
wherein if a dielectric constant in a direction parallel to a long axis of liquid crystals is defined as a horizontal dielectric constant $\in\|$, a dielectric constant in a direction perpendicular to the long axis of the liquid crystals is defined as a vertical dielectric constant $\in\perp$, and the difference between the vertical dielectric constant $\in\perp$ and the horizontal dielectric constant $\in\|$ is defined as dielectric anisotropy $\Delta\in$, then a ratio $\Delta\in/\in\perp$ of the dielectric anisotropy $\Delta\in$ to the vertical dielectric constant $\in\perp$ of the liquid crystal composition is 0.5 or less, and
wherein a rotational viscosity of the liquid crystal composition is 90 to 110 mPa·S.

2. The LCD of claim 1, wherein the liquid crystal composition comprises 10 to 30 weight % of an alkenyl.

3. The LCD of claim 2, further comprising:
a second gate line disposed on the first display panel, the data line crossing the second gate line;
a control switching element configured to be switched on or off in response to a gate signal transmitted from the second gate line and is connected to the second subpixel electrode;
a first control electrode that is connected to the control switching element; and
a second control electrode, which overlaps the first control electrode to form a control capacitor, configured to receive a control voltage.

4. The LCD of claim 3, wherein the first control electrode is made of indium tin oxide (ITO) or indium zinc oxide (IZO).

5. The LCD of claim 3, wherein the control voltage is a common voltage.

6. The LCD of claim 3, further comprising a black matrix disposed on the first display panel or the second display panel and overlapping the first control electrode and the second control electrode.

7. The LCD of claim 3, wherein the second gate line is a gate line of an adjacent pixel.

8. The LCD of claim 1,
wherein storage wiring, which overlaps each of the first and second subpixel electrodes to form a capacitor, is omitted from the LCD.

9. The LCD of claim 8, further comprising a slit between the first and second subpixels, the slit being at an angle of −45 to +45 degrees with respect to the first gate line.

10. A liquid crystal display (LCD), comprising:
a first display panel;
a second display panel facing the first display panel;
a liquid crystal composition disposed between the first display panel and the second display panel;

a first gate line and a second gate line disposed on the first display panel;
a data line that crosses the first gate line and the second gate line;
a first subpixel electrode disposed on the first display panel and connected to the first gate line by a first switching element;
a second subpixel electrode disposed on the first display panel, spaced apart from the first subpixel electrode, and connected to the first gate line by a second switching element;
a control switching element configured to be switched on or off in response to a gate signal transmitted from the second gate line and is connected to the second subpixel electrode;
a first control electrode that is connected to the control switching element; and
a second control electrode, which overlaps the first control electrode to form a control capacitor, configured to receive a control voltage,
wherein if a dielectric constant in a direction parallel to a long axis of liquid crystals is defined as a horizontal dielectric constant $\in\|$, a dielectric constant in a direction perpendicular to the long axis of the liquid crystals is defined as a vertical dielectric constant $\in\perp$, and the difference between the vertical dielectric constant $\in\perp$ and the horizontal dielectric constant $\in\|$ is defined as dielectric anisotropy $\Delta\in$, then a ratio $\Delta\in/\in\perp$ the dielectric anisotropy $\Delta\in$ to the vertical dielectric constant $\in\perp$ of the liquid crystal composition is 0.5 or less, and
wherein the first subpixel electrode and the second subpixel electrode are bent in a zigzag manner.

* * * * *

UNITED STATES PATENT AND TRADEMARK OFFICE
CERTIFICATE OF CORRECTION

PATENT NO.         : 8,610,867 B2  
APPLICATION NO.    : 12/356370  
DATED              : December 17, 2013  
INVENTOR(S)        : Kim et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 832 days.

Signed and Sealed this
Twenty-first Day of April, 2015

Michelle K. Lee
*Director of the United States Patent and Trademark Office*